United States Patent
Smith et al.

(10) Patent No.: US 6,726,229 B2
(45) Date of Patent: Apr. 27, 2004

(54) INTEGRAL SPRING DAMPER AND CROSS MEMBER

(75) Inventors: Mark C. Smith, Troy, MI (US); Daniel E. Whitney, Arlington, MA (US); Robert P. Carlstedt, Rochester Hills, MI (US); Eric Stephen Geib, Fenton, MI (US); Steven M. Foster, Rochester, MI (US); Richard M. Clisch, Canton, MI (US); Shan Shih, Troy, MI (US); Juan Jose Marcos Munoz, Navara (ES)

(73) Assignee: Meritor Light Vehicle Technology, LLC, Troy, MI (US)

( * ) Notice: Subject to any disclaimer, the term of this patent is extended or adjusted under 35 U.S.C. 154(b) by 0 days.

(21) Appl. No.: 10/039,092

(22) Filed: Jan. 2, 2002

(65) Prior Publication Data

US 2003/0122341 A1 Jul. 3, 2003

(51) Int. Cl.$^7$ .............................................. B60G 3/20
(52) U.S. Cl. ........................ 280/124.141; 280/124.135; 280/788
(58) Field of Search .................... 280/124.134, 124.135, 280/124.136, 124.141, 788

(56) References Cited

U.S. PATENT DOCUMENTS

| | | | |
|---|---|---|---|
| 1,058,588 A | * 4/1913 | Hubbard | ..................... 280/788 |
| 1,480,279 A | * 1/1924 | MacLachlan | ............... 280/104 |
| 1,998,641 A | 4/1935 | Shaw | |
| 2,064,404 A | 12/1936 | Bell | |
| 2,126,085 A | * 8/1938 | Balz | ............................ 267/249 |
| 2,305,820 A | 12/1942 | Wagner | |
| 2,347,948 A | * 5/1944 | Hassett | ........................ 267/249 |
| 2,606,021 A | 8/1952 | Hexel | |
| 2,643,110 A | 6/1953 | Gregoire | |
| 2,950,122 A | * 8/1960 | Erickson | .................... 280/104 |
| 3,007,714 A | * 11/1961 | Olney | ..................... 280/414.1 |
| 3,448,995 A | * 6/1969 | Stallard et al. | ....... 280/124.106 |
| 3,589,700 A | * 6/1971 | Ruet et al. | ................ 280/5.515 |
| 3,598,385 A | 8/1971 | Parsons, Jr. | |
| 3,632,127 A | * 1/1972 | Grosseau | ............. 280/124.136 |
| 3,685,854 A | * 8/1972 | Cadiou | ....................... 180/90.6 |
| 3,711,113 A | * 1/1973 | Stammreich | ............... 280/5.51 |
| 4,515,390 A | * 5/1985 | Greenberg | ........... 280/124.102 |
| 4,534,575 A | * 8/1985 | Grove et al. | .......... 280/124.136 |
| 4,566,717 A | 1/1986 | Arthur et al. | |
| 4,815,762 A | * 3/1989 | Jurr | ...................... 280/124.141 |
| 4,881,752 A | * 11/1989 | Tanaka | ................ 280/124.128 |
| 5,082,306 A | 1/1992 | Khavkin | |
| 5,098,116 A | 3/1992 | Edahiro et al. | |
| 5,197,755 A | 3/1993 | Quick | |
| 5,382,034 A | * 1/1995 | Parker et al. | ................ 280/104 |
| 5,390,949 A | * 2/1995 | Naganathan et al. | ..... 280/5.515 |
| 5,415,426 A | 5/1995 | Strasser | |
| 5,431,429 A | * 7/1995 | Lee | ...................... 280/124.139 |
| 5,558,361 A | 9/1996 | Shin | |
| 5,758,896 A | * 6/1998 | Cruise | ................. 280/124.167 |
| 5,820,153 A | * 10/1998 | Pellerin | ............... 280/124.116 |
| 5,839,742 A | * 11/1998 | Holt | .................... 280/124.134 |
| 5,954,352 A | 9/1999 | Rumpel et al. | |
| 6,039,337 A | * 3/2000 | Urbach | ................ 280/124.134 |
| 6,082,748 A | 7/2000 | Hartmann et al. | |
| 6,161,853 A | * 12/2000 | Jung | .................... 280/124.136 |

FOREIGN PATENT DOCUMENTS

JP          4-278814     * 5/1992

\* cited by examiner

*Primary Examiner*—Paul N. Dickson
*Assistant Examiner*—George D. Spisich
(74) *Attorney, Agent, or Firm*—Carlson, Gaskey & Olds

(57) ABSTRACT

A suspension assembly for a motor vehicle includes upper and lower control arms pivotally attached to a frame member of the vehicle. A knuckle arm pivotally attaches to the upper and lower control arms moves along a substantially vertical axis in response to wheel movement caused by an uneven road surface. An actuation link is attached to one of the control arms at one end and to a damper assembly at another end. The damper assembly is disposed substantially within the frame member along a second axis transverse to vertical movement of the wheel and is actuated along the transverse axis in response movement of the control arm along the substantially vertical axis.

15 Claims, 3 Drawing Sheets

INTEGRAL SPRING DAMPER AND CROSS MEMBER

BACKGROUND OF THE INVENTION

This invention relates to suspension assembly for a motor vehicle to support a wheel, including a horizontally mounted damper assembly.

Typically, a suspension system for a motor vehicle includes a wheel pivotally attached to a vehicle frame such that the wheel will move in a substantially vertical direction in response to an uneven road surface. One type of conventional suspension system includes upper and lower control arms pivotally connected to a frame member of the motor vehicle. A link commonly referred to as a knuckle, or kingpin is pivotally attached to both the upper and lower control arms and includes an axle assembly to which the vehicle wheel is mounted. This general suspension assembly configuration may be used for front or rear suspension assemblies. The control arms allow vertical movement of the wheel relative to the motor vehicle frame. A damper is typically mounted substantially parallel to vertical movement of the wheel and attached to one or both of the control arms to dampen sudden jolts by an uneven road.

A vertically mounted damper assembly imposes several design challenges to motor vehicle manufactures. Vertically mounted damper assemblies consume space that could otherwise be used in the cargo or passenger compartments. In an effort to reduce vertical space requirements for the damper assembly, suspension assemblies with horizontally mounted damper assemblies have been developed. However, horizontally mounted damper assemblies currently available are not easily adaptable to current motor vehicle configurations. For these reasons there is a need for a suspension system with a horizontally mounted damper assembly adaptable to current motor vehicle configurations.

SUMMARY OF THE INVENTION

The invention is a suspension assembly for motor vehicles including a wheel assembly movably mounted to the motor vehicle with a damper or spring arranged substantially horizontal. The suspension assembly includes an upper and lower control arm pivotally attached to the frame of the motor vehicle and a knuckle arm pivotally attached to the upper and lower control arms. The knuckle arm includes an axle to which the wheel is mounted. This entire assembly is movable vertically upon the wheel encountering an uneven road surface. Attached to one of the control arms is an actuation arm. A damper assembly mounted horizontally and within a cylinder member is actuated in response to vertical movement of the wheel. An actuation arm disposed on one of the control arms is pivotally attached to an actuation link of the damper assembly such that vertical movement of the control arm actuates the horizontally positioned damper assembly.

An additional embodiment of the suspension assembly includes a flexible link pivotally attached to the upper control arm at a first end and to the damper assembly at a second end. A pulley is mounted to the frame member and the flexible link is routed about the pulley to change vertical motion of the control arm into horizontal motion to actuate the damper assembly disposed within the frame member. A plate disposed on the control arm includes a progressive profile that engages the flexible link such that the amount of pull to actuate the damper assembly relative to vertical movement of the control arm is progressively increased.

The suspension assembly of this invention provides for the horizontal mounting of the damper assembly by converting the vertical motion of the wheel to horizontal motion to actuate the damper assembly, thereby providing a simple adaptable suspension assembly.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
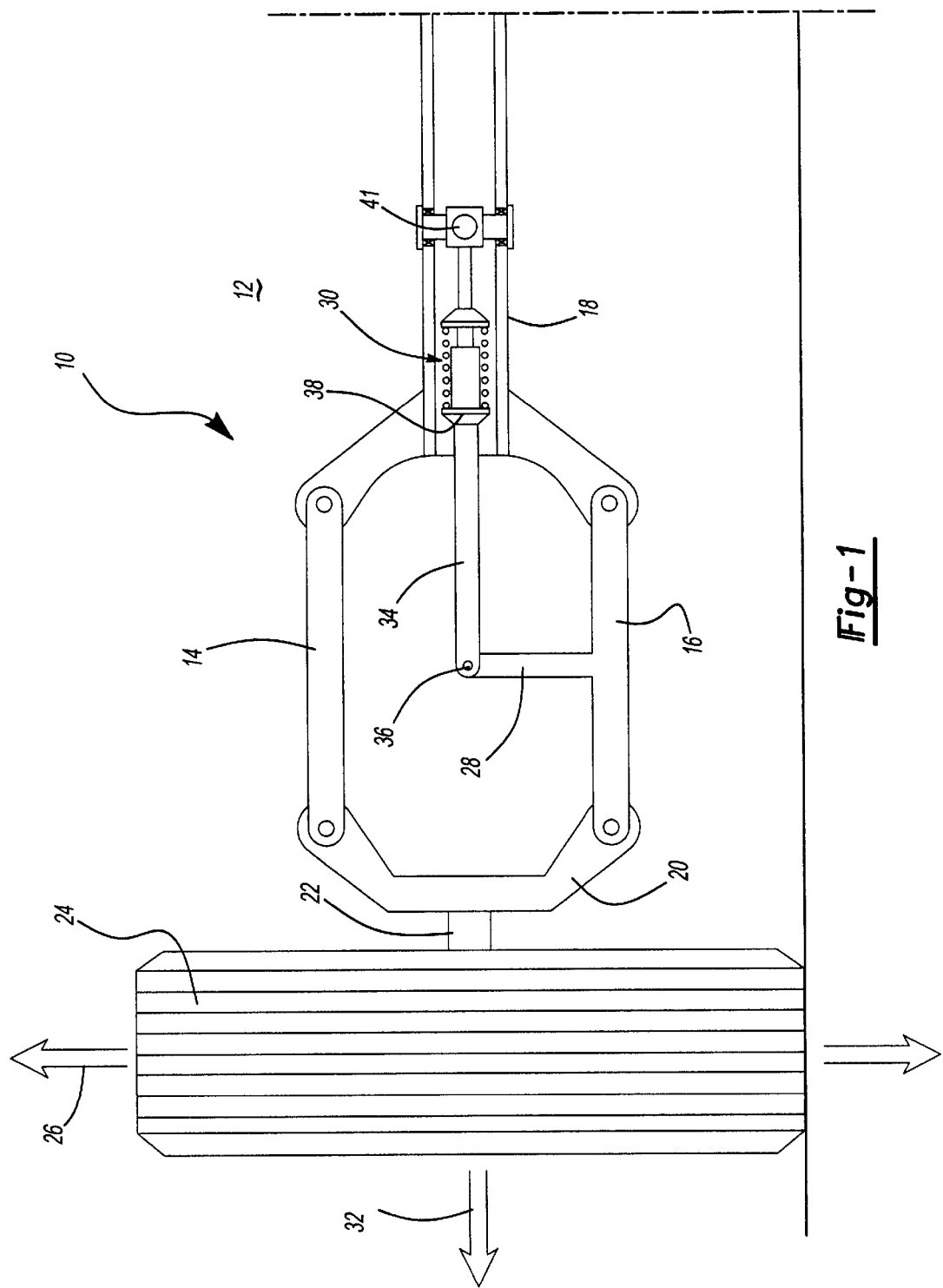
FIG. 1 is a cross-sectional view of the subject suspension assembly mounted on a motor vehicle.

Referring to the Figures, wherein like numerals indicate like or corresponding parts throughout the several views, the invention is a suspension assembly for a vehicle and is generally indicated at 10 in FIG. 1. The suspension system 10 includes upper and lower control arms 14, 16 pivotally attached to a cylinder member 18. Preferably, the cylinder member may be part of a frame structure for the vehicle. This aspect of the invention is more completely disclosed in co pending U.S. patent application Ser. No. 10/044,699 entitled "Incorporation of Suspension Elements in Vehicle Frame Components". A knuckle arm 20 is pivotally attached between the upper and lower control arms 14, 16. The pivotal connection between the knuckle arm 20 and the control arms 14, 16 is opposite the pivotal connection to the cylinder member 18 thereby forming a parallelogram with the control arms 14, 16 composing upper and lower links and the cylinder member 18 and knuckle arm 20 composing side links.

The knuckle arm 20 includes a wheel support member 22 that supports a wheel 24. Upon encountering an uneven road surface the wheel will move vertically, causing the knuckle arm 20 and the control arms 14,16 to move in a parallelogram fashion where the knuckle arm 20 moves vertically and parallel with the frame member along a substantially vertical axis 26 and the control arms 14,16 will pivot between the cylinder member 18 and the knuckle arm 20.

An actuation arm 28 extends from the lower control arm 16 toward the upper control arm 14. The actuation arm 28 is rigidly attached to pivot with the lower control arm 16 as the knuckle arm 20 and thereby the lower control arm 16 moves along the vertical axis 26.

A damper assembly 30 is attached to the frame member along an axis 32 transverse to the vertical axis 26. Preferably, the damper assembly 30 includes a spring and shock combination. It is within the contemplation of the subject invention that any type of damper assembly such as fluid filled shock absorbers, coil springs or and combination of the same may be used in conjunction with this invention. Preferably the damper assembly 30 is attached at least partially within the cylinder member 18. The damper assembly 30 includes an actuation link 34 with a fixed connection 38 to the damper assembly 30 and a pivotal connection 36 to the actuation arm 28. Vertical movement of the actuation arm 28 pushes to compress and engage the damper assembly 30. The damper assembly 30 shown in FIG. 1, includes a pivotal connection 41 within the cylinder member 18 to accommodate angular movement of the damper assembly 30 and thereby the actuation arm 28 such that a pivotal connection between the actuation link 34 and the damper assembly 30 is not required.

Figure 2:
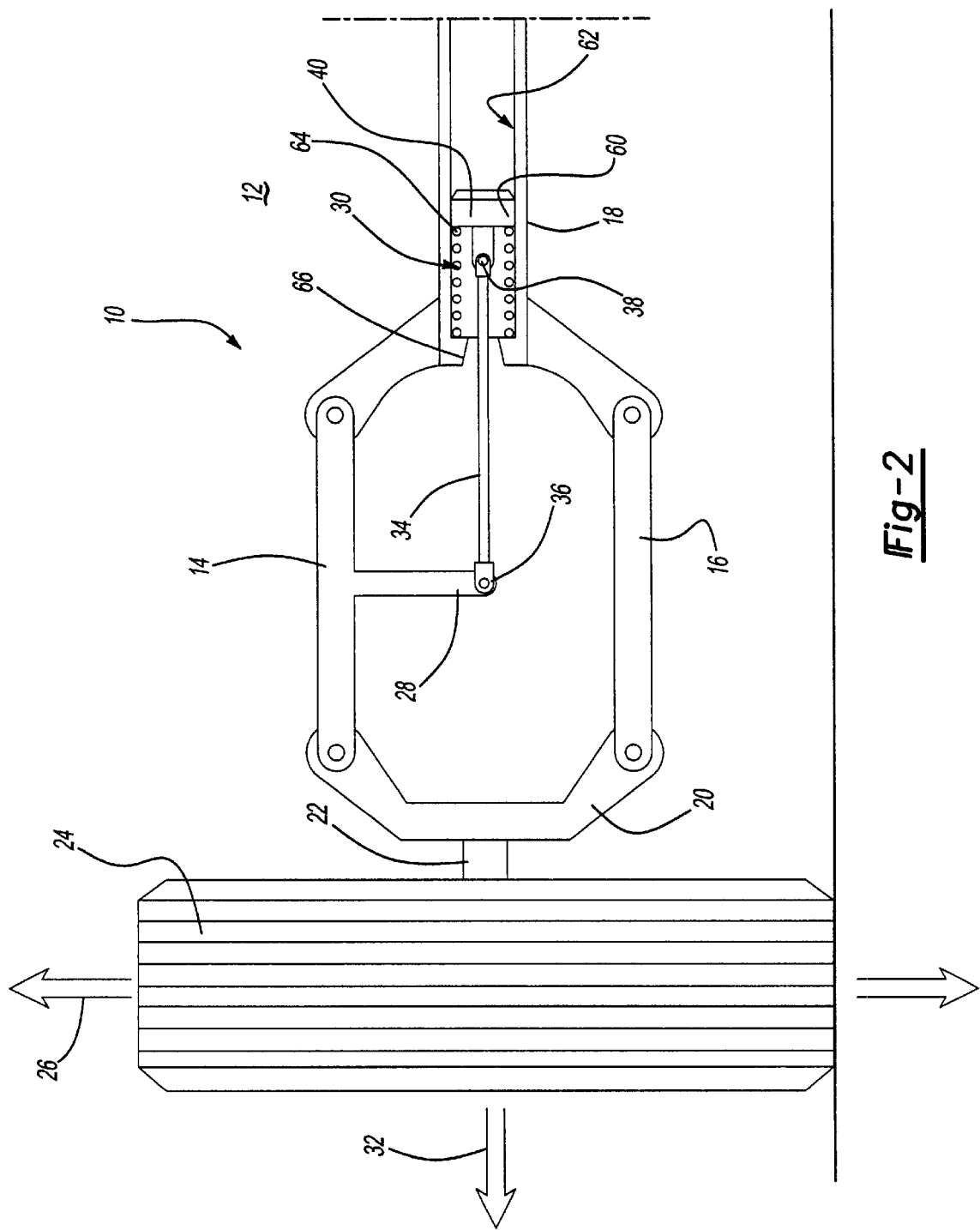
FIG. 2 is a cross-sectional view of another embodiment of the suspension assembly mounted to a motor vehicle.

Referring to FIG. 2, another embodiment of the suspension assembly 10 includes the actuation arm 28 attached to the upper control arm 14. Vertical movement of the actuation arm 28 attached to the upper control arm 14 pulls on the damper assembly 30. The damper assembly 30 of the second embodiment is an integral part of the cylinder member 18. The damper assembly 30, shown in FIG. 2, includes a piston 60 guided along interior walls 62 of the cylinder member 18. A compression spring 64 is disposed between the piston 60 and ridge portion 66 of the cylinder member 18. The actuation link 34 attaches to the piston 60 at a pivotal connection 40. With the actuation arm 28 attached to the upper control arm 14, upward vertical movement of the actuation arm 28 pulls on the actuation link 34 attached to the piston 60 to compress the damper spring 64.

Figure 3:
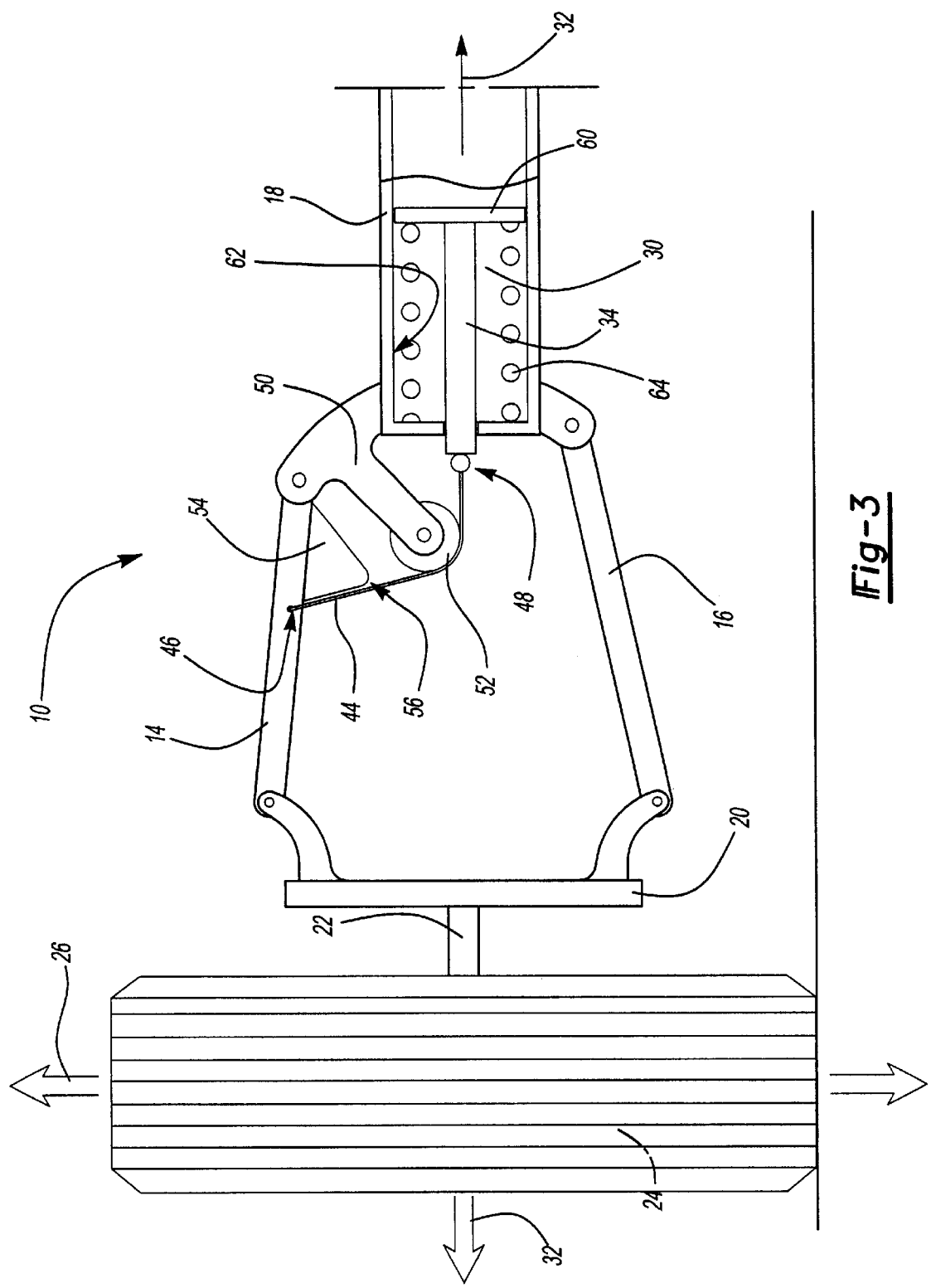
FIG. 3 is a cross-sectional view of an additional embodiment of the suspension assembly.

Referring to FIG. 3, another embodiment of the assembly 10 is disclosed. In this embodiment the upper control arm 14 actuates the damper assembly 30 through a flexible link 44. As in the previous embodiments the upper and lower control arms 14, 16 are pivotally attached to the cylinder member 18. The knuckle arm 20 is pivotally attached to the control arms 14,16 opposite the cylinder member 18. The knuckle arm 20 includes a shaft 22 for the mounting of the wheel 24.

Preferably the flexible link 44 is a cable attached to the upper control arm 14 at a first end 46 and to the damper assembly 30 at a pivotal connection 48. The flexible link 44 attaches to the actuation link 34 of the damper assembly 30 at a pivotal connection 48. The actuation link 34 extends into the cylinder member 18 and attaches to the piston 60. Preferably, the damper assembly 30 is an integral part of the cylinder member 18. Although the damper assembly 30 in this embodiment is integral to the cylinder member 18, it is within the contemplation of this invention that the damper assembly may be of any configuration known in the art.

The cable actuates the damper assembly 30 by converting vertical motion of the upper control arm 14 along the vertical axis 26 into motion along the horizontal axis 32. A stationary arm 50 extends from the cylinder member 18 to provide a mounting point for a pulley 52. The flexible link 44 extends around the pulley 52 to pull on the damper assembly 30 along the axis 32. A guide plate 54 having a profile 56 is attached to the upper control arm and the flexible link 44 is routed over the profile 56 of the guide plate 54. The profile 56 of guide plate 54 provides for the flexible link 44 to translate movement of the upper control arm 14 into actuation of the damper assembly 30 in a non-linear fashion such that the rate of actuation of the damper assembly 30 changes relative to movement of the upper control arm 14.

In operation, the flexible link 44 is kept in tension by the vehicle weight and the force exerted by the spring 64 of the damper assembly 30. As the upper control arm 14 moves upwardly along the vertical axis 26 the flexible link 44 is guided along the profile 56 such that the rate of movement of the upper control arm 14 relative to actuation of the damper assembly 30 is increased. The effect of this increased actuation of the damper assembly 30 is to slow movement of the vehicle wheel 24 along the vertical axis 26 as it approaches extreme limit of travel.

The foregoing description is exemplary and not just a material specification. The invention has been described in an illustrative manner, and should be understood that the terminology used is intended to be in the nature of words of description rather than of limitation. Many modifications and variations of the present invention are possible in light of the above teachings. The preferred embodiments of this invention have been disclosed, however, one of ordinary skill in the art would recognize that certain modifications are within the scope of this invention. It is understood that within the scope of the appended claims, the invention may be practiced otherwise than as specifically described. For that reason the following claims should be studied to determine the true scope and content of this invention.

What is claimed is:

1. A suspension assembly for supporting a wheel of a motor vehicle comprising;
    a frame member of the motor vehicle;
    upper and lower control arms pivotally attached to said frame member;
    a knuckle arm pivotally attached to said control arms for movement along a substantially vertical axis;
    a damper assembly disposed within said frame member along a second axis transverse to said vertical axis;
    a flexible link having first and second ends, said first end attached to said upper control arm, and said second end attached to said damper assembly, whereby said damper assembly is actuated by movement of said control arm.

2. The assembly of claim 1, further including a pulley mounted to said frame member and said link is routed about said pulley such that said link pulls on said damper assembly along said transverse axis in response to movement of said control arm along said vertical axis.

3. The assembly of claim 2, further including a guide plate disposed on one of said control arms and having a profile, and said flexible link is guided on said profile such said flexible link actuates said damper assembly in a progressively increasing manner relative to movement of said control arm.

4. The assembly of claim 1, wherein said damper assembly is a shock absorber and coil spring.

5. The assembly of claim 1, wherein said damper assembly is an integral part of said frame member and said link includes a pivotal connection to said damper assembly.

6. The assembly of claim 1, wherein said damper assembly includes a piston guided within said frame member and a spring disposed between said piston and said frame member, said piston including a pivotal connection to said second end of said link.

7. The assembly of claim 6, wherein said spring biases said piston along said second axis away from the wheel of the motor vehicle.

8. The assembly of claim 1, wherein a weight of the motor vehicle places said link under tension.

9. The assembly of claim 1, wherein a weight of the motor vehicle is at least partially supported by said damper assembly.

10. A suspension assembly for supporting a wheel of a motor vehicle comprising;
    a frame member of the motor vehicle;
    upper and lower control arms pivotally attached to said frame member;
    a knuckle arm pivotally attached to said control arms for movement along a substantially vertical axis;
    a flexible link attached to one of said control arms;
    a damper assembly disposed within said frame member along a second axis transverse to said vertical axis and actuated along said transverse axis by movement of said flexible link.

11. The suspension assembly of claim 10, further including a pulley mounted to said frame member to guide said flexible link into alignment with said damper assembly.

12. The suspension assembly of claim 11, further including a guide plate disposed on one of said control arms and having a profile, and said flexible link is guided on said profile such said flexible link actuates said damper assembly in a progressively increasing manner relative to movement of said control arm.

13. The suspension assembly of claim 10, wherein said flexible link is a cable pivotally attached at a first end to said upper control arm and at a second end to said damper assembly.

14. The suspension assembly of claim 10, wherein said damper assembly includes a shock absorber and a coil spring.

15. The suspension assembly of claim 10, wherein said damper assembly includes a coil spring.

* * * * *